(12) United States Patent  
Hsia et al.

(10) Patent No.: US 7,500,343 B2
(45) Date of Patent: Mar. 10, 2009

(54) FRUIT PICKER APPARATUS WITH A MOTOR OPERATED CUTTER

(76) Inventors: Chih-Yu Hsia, 301 Warren Way, Arcadia, CA (US) 91007; Michael Jonathan Hsia, 301 Warren Way, Arcadia, CA (US) 91007; Patricia Shirley Hsia, 301 Warren Way, Arcadia, CA (US) 91007

( * ) Notice: Subject to any disclaimer, the term of this patent is extended or adjusted under 35 U.S.C. 154(b) by 0 days.

(21) Appl. No.: 11/511,010

(22) Filed: Aug. 28, 2006

(65) Prior Publication Data

US 2008/0060337 A1   Mar. 13, 2008

(51) Int. Cl.
*A01D 46/24* (2006.01)
(52) U.S. Cl. ........................................................ 56/332
(58) Field of Classification Search .................. 56/332, 56/339, 328.1, 334, 335, 336, 330; 414/588; 47/8; 193/7
See application file for complete search history.

(56) References Cited

U.S. PATENT DOCUMENTS

| | | | | |
|---|---|---|---|---|
| 2,346,986 A | * | 4/1944 | Metzger | 56/335 |
| 3,165,880 A | * | 1/1965 | Buie, Jr. | 56/336 |
| 3,449,896 A | * | 6/1969 | Burgess | 56/339 |
| 3,507,107 A | * | 4/1970 | McCutcheon et al. | 56/336 |
| 3,572,021 A | * | 3/1971 | McDonald | 56/334 |
| 4,060,962 A | * | 12/1977 | Cooper | 56/336 |
| 4,357,790 A | * | 11/1982 | Tyros | 56/328.1 |
| 4,519,193 A | * | 5/1985 | Yoshida et al. | 56/328.1 |
| 4,663,925 A | * | 5/1987 | Terada | 56/328.1 |
| 5,347,800 A | * | 9/1994 | Morgan | 56/335 |
| 5,724,799 A | * | 3/1998 | Hsia | 56/339 |
| 5,857,316 A | * | 1/1999 | Murdock | 56/332 |
| 6,298,645 B1 | * | 10/2001 | Hai | 60/781 |

* cited by examiner

*Primary Examiner*—Árpád Fábián-Kovács
(74) *Attorney, Agent, or Firm*—William W. Haefliger

(57) ABSTRACT

A fruit picket apparatus with a motor operated cutter which can be mounted on a pole consists of a basket unit and a cutter assembly; the cutter assembly having a knife which is mounted on a motor which connects with a wire/conductor loop; which includes a switch which can be closed by the stem of a fruit to be picked; the basket unit having a basket which can hold and protect fruits; the basket unit having a compartment which can house the motor of the cutter assembly; the basket unit having a device to be clamped on a pole or a rod; the basket unit having a compartment which can house at least a battery and a portion of the wire/conductor loop of the cutter assembly.

19 Claims, 19 Drawing Sheets

US 7,500,343 B2

FRUIT PICKER APPARATUS WITH A MOTOR OPERATED CUTTER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to fruit pickers and particularly to a fruit picker apparatus with a motor operator cutter that can be activated by interactions with the stem of a fruit to be picked and be deactivated by the removal of the fruit.

2. Description of Related Art Including Information Disclosed Under 37 CFR 1.97 and 1.98.

No prior art related to fruit picker apparatus with a motor operated cutter was found.

BRIEF SUMMARY OF THE INVENTION

Picking fruits from fruit trees by hands most of the time requires the use of the ladders. To avoid using ladders, fruit pickers mounted at the end of poles can be used to reach fruits on high branches. However, picking fruits from trees with ordinary fruit pickers often damages the fruits because ordinary fruit pickers remove the fruits by pulling the fruits off the stems or branches. Therefore, a fruit picker which will not damage the fruits and can reduce the need of using ladders are sought.

The current invention will provide a device which can be mounted easily on the tip of a pole so that picking fruits on the high branches will not require the use of ladder. The invented fruit picker will have a cutter to remove the fruits from the trees so that the fruits will not be damaged. In addition, the stems and branches will receive less damage. The cutter of the invented device will be able to be activated and deactivated automatically. The invented device will also provide a relatively sturdy basket to collect and protect the picked-up fruits.

These and other objects and advantages of the invention, as well as the details of an illustrative embodiment, will be more fully understood from the following specification and drawings, in which:

BRIEF DESCRIPTION OF THE SEVERAL VIEWS OF THE DRAWING(S)

FIG. 4 shows all of the hidden lines.

FIG. 6 shows all of the hidden lines.

FIG. 8 shows all of the hidden lines.

FIG. 10 shows all of the hidden lines.

FIG. 16 shows all of the hidden lines.

FIG. 18 shows all of the hidden lines.

DETAILED DESCRIPTION OF THE INVENTION

Figure 1:
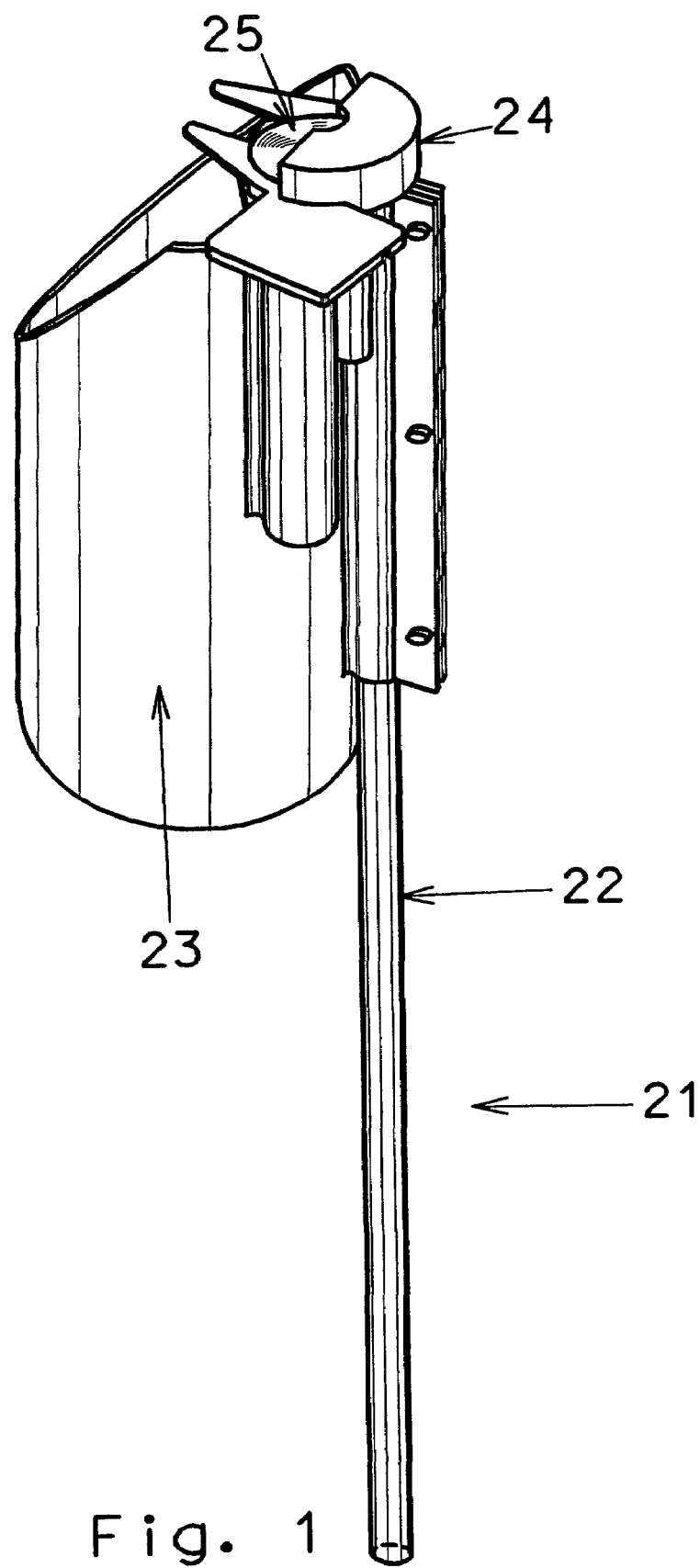
FIG. 1 is an isometric view of the invented device. The hidden lines are not shown in FIG. 1.
Figure 2:
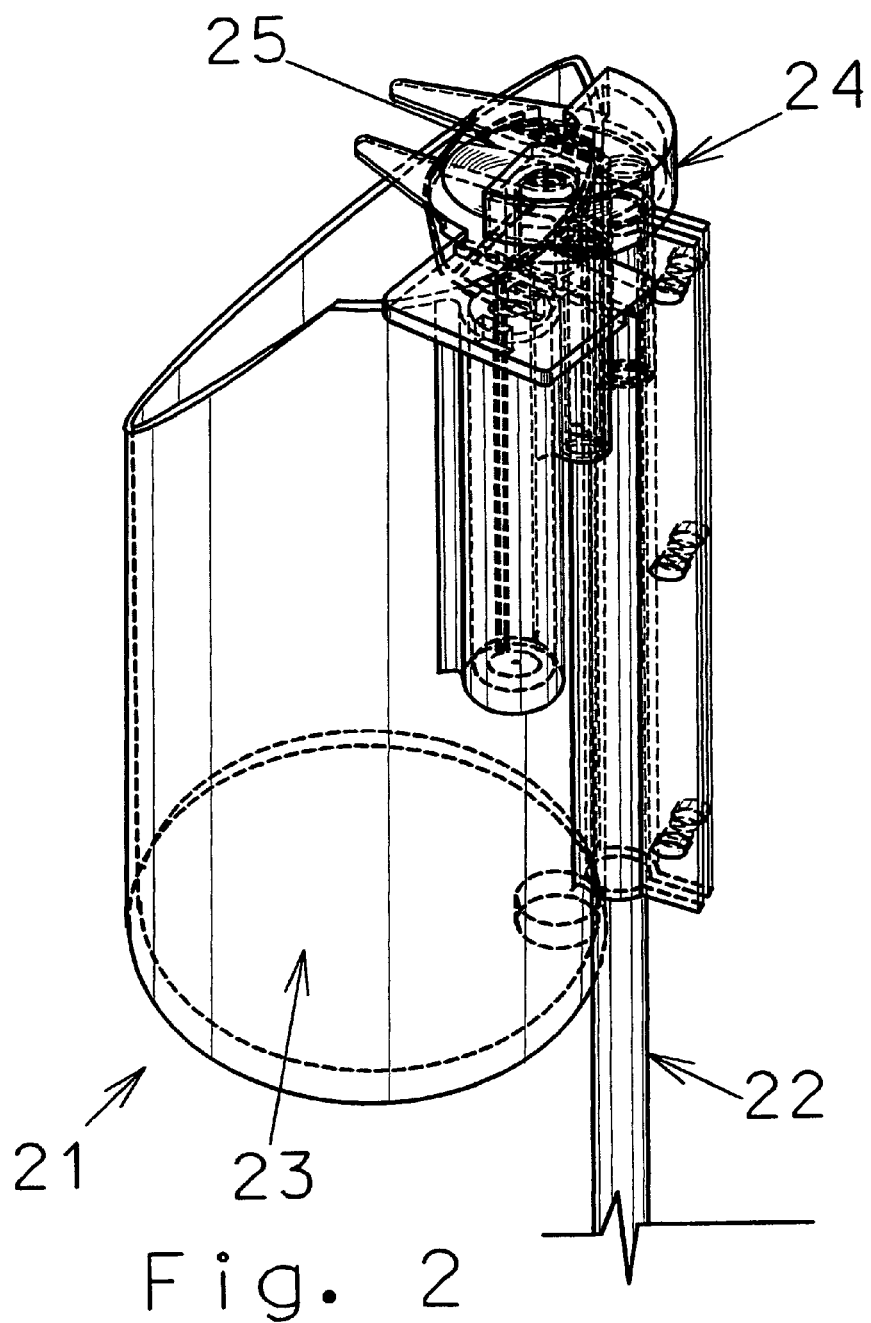
FIG. 2 is an isometric view of partial of the device shown in FIG. 1. All hidden lines of the device are shown in FIG. 2.

Referring to FIGS. 1 and 2, the first variation of the invented fruit picker with a motor operated cutter 21 consists of a basket unit 23, a header 24, and a cutter assembly 25. The basket unit can be mounted on a pole 22. The header and the cutter assembly are mounted on the basket unit.

Figure 3:
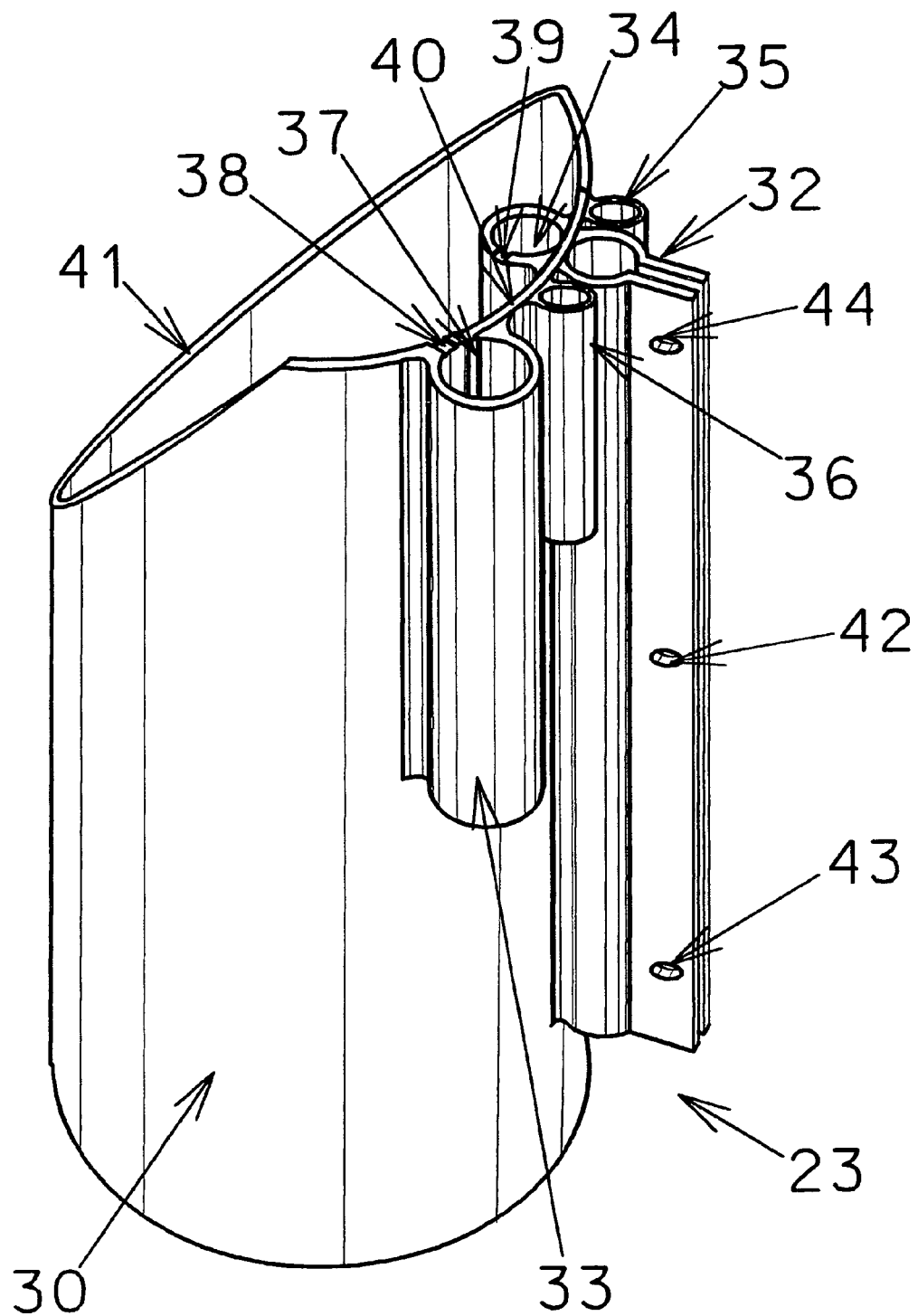
FIG. 3 is an isometric view of the component, the basket unit, of the device shown in FIG. 1. No hidden line is shown in FIG. 3.
Figure 4:
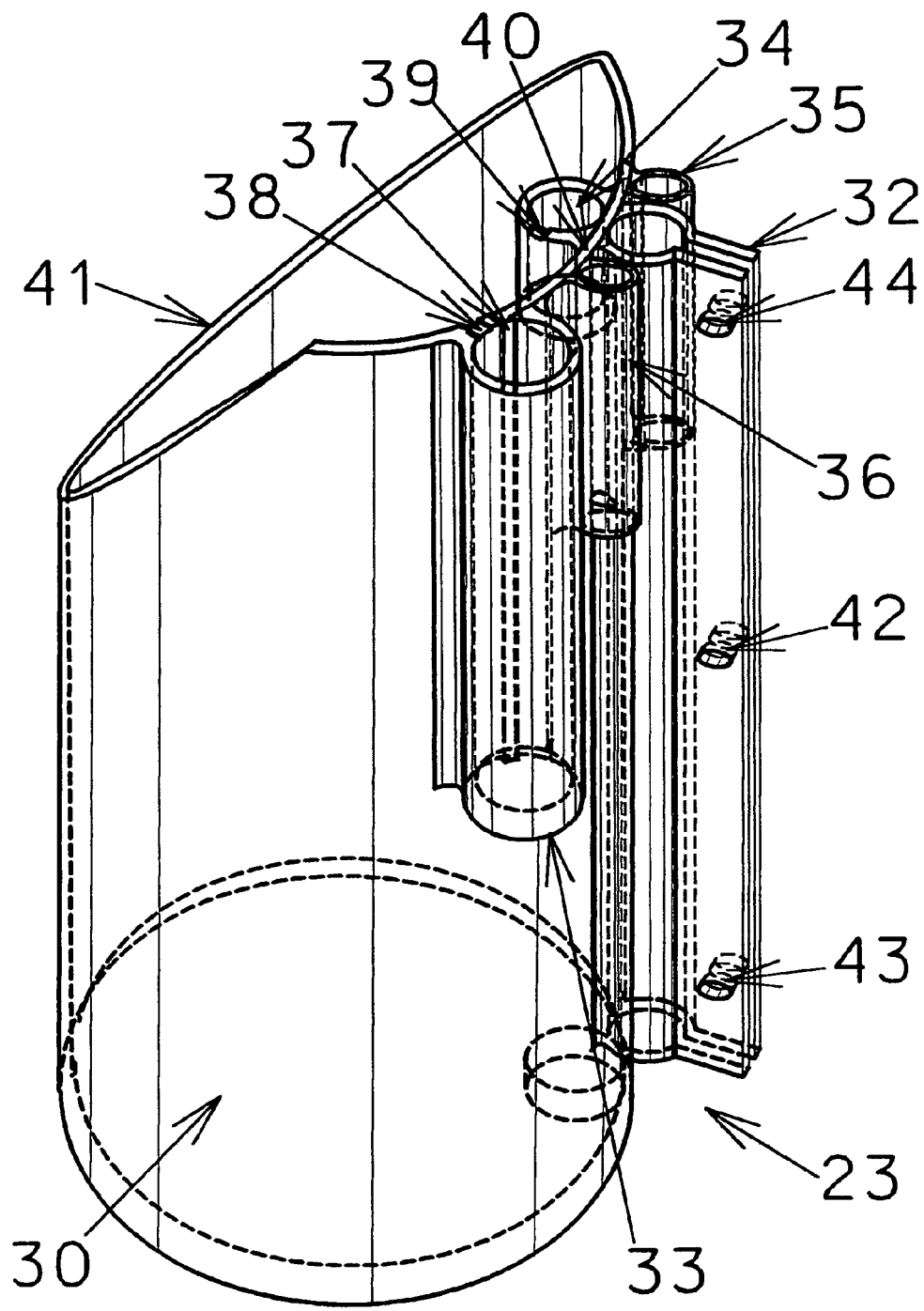
FIG. 4 is an isometric view of the same component shown in FIG. 3.

Referring to FIGS. 3 and 4, the basket unit 23 consists of a basket 30, a clamp 32, a battery compartment 33, a motor housing 34, and two header female fasteners 35 and 36. The basket is a container which can hold and protect the picked fruits inside. The clamp is a clamp which enables the basket unit to be mounted on a pole, a stick or a rod by fastening means through the clamp fastener holes 42, 43 and 44. The battery compartment is a compartment which can house at least one battery and some of the conductors/wires of the cutter assembly which will be discussed later. The motor housing is a compartment which can house a motor. The header female fastener is a tube or a hole on the wall of the basket unit. The header female fastener can engage with the header male fastener which will be discussed in a later paragraph. There are grooves, the conductor grooves 37, 38, 39 and 40 on the battery compartment 33, the motor housing 34 and on the rim 41 of the basket 30, respectively. The conductor grooves provide means to receive/mount portions of the wire/conductor loop which will be described later. A portion of the rim 41 of the basket 30 is slant downwards to facilitate the receiving of the fruit to be picked by the basket.

Figure 5:
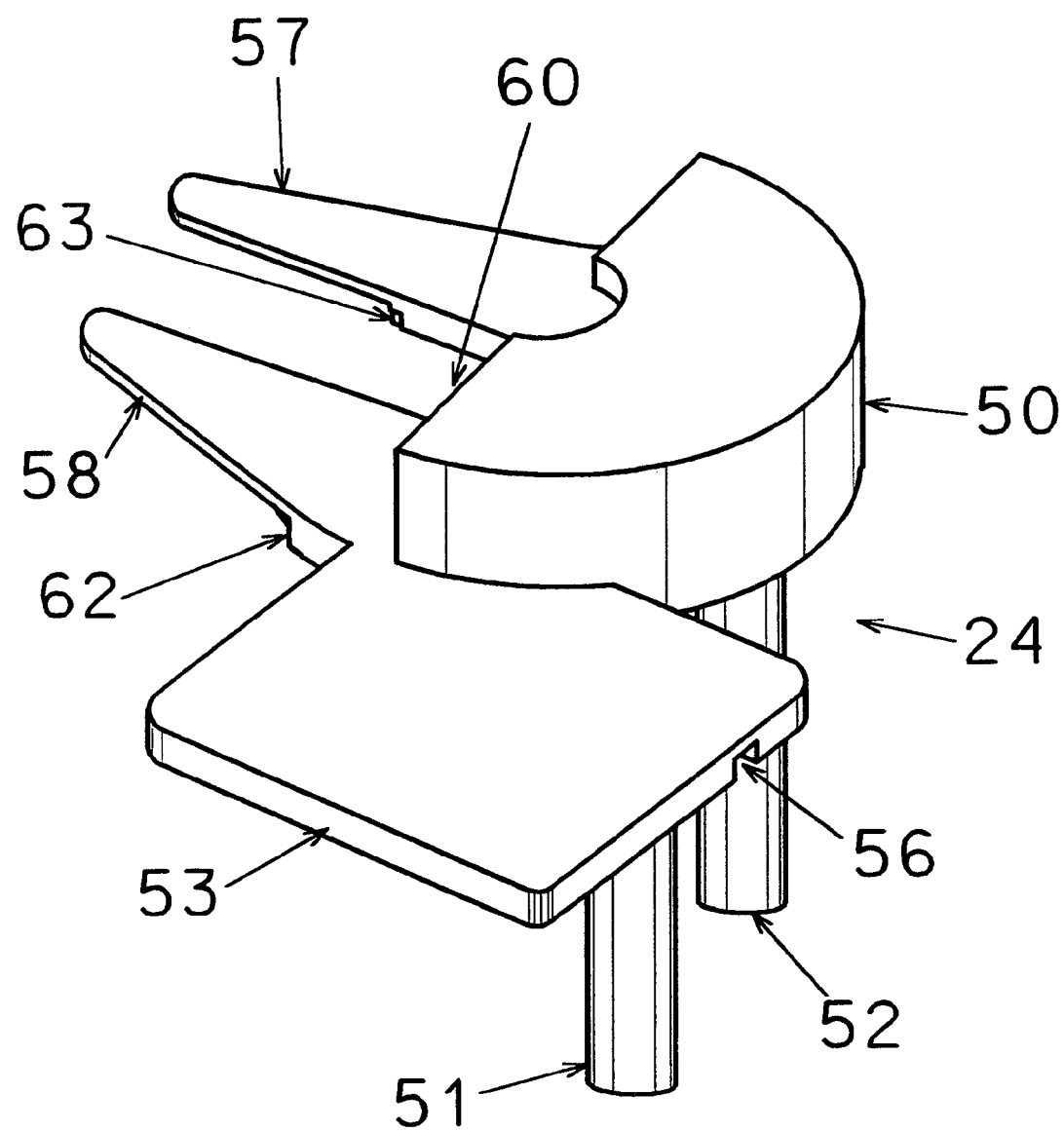
FIG. 5 is an isometric view of another component, the header, of the device shown in FIG. 1. No hidden line is shown in FIG. 5.
Figure 6:
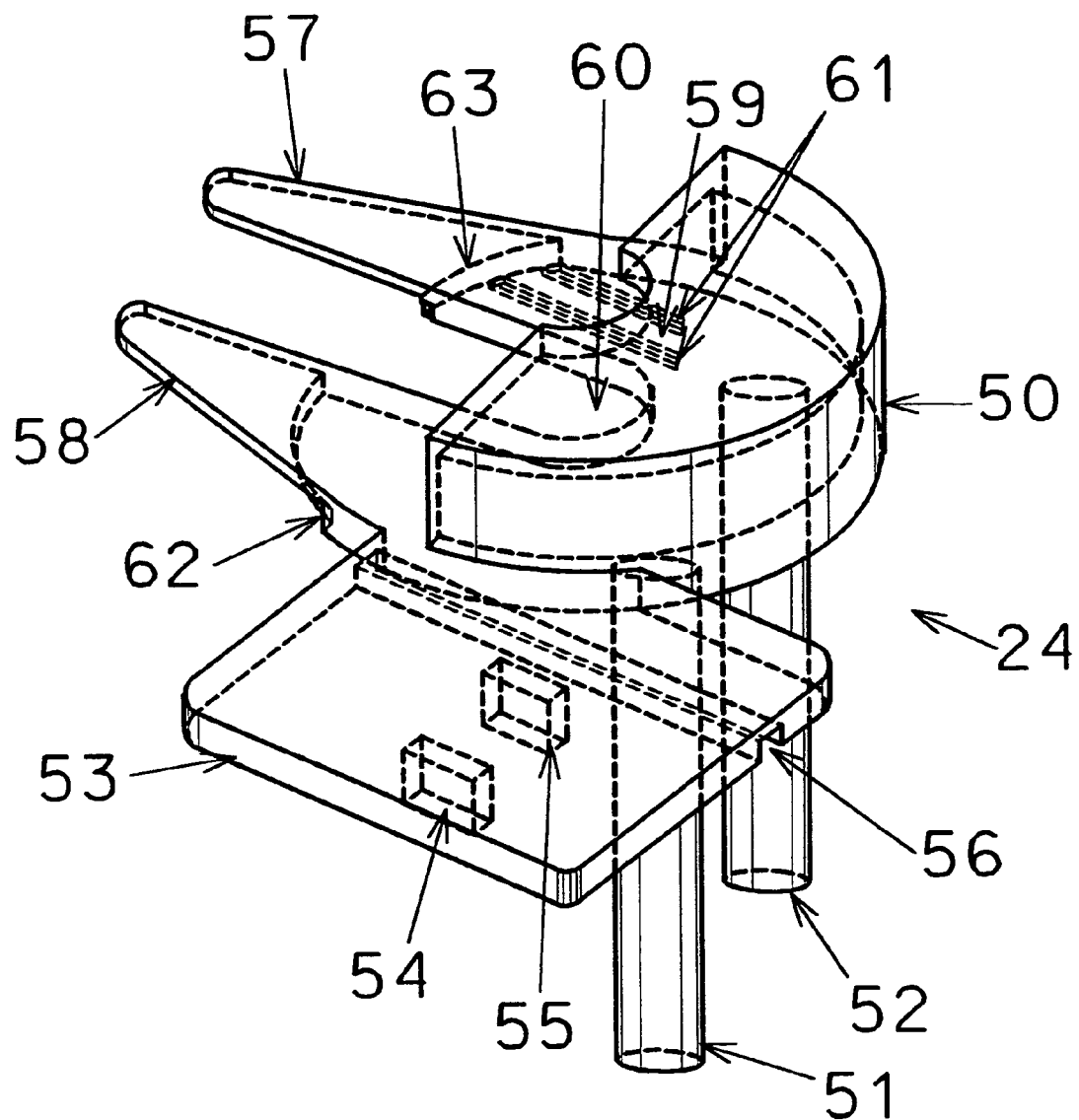
FIG. 6 is an isometric view of the same component shown in FIG. 5.

Referring to FIGS. 5 and 6, a header 24 consists of a cutter housing 50, a two header male fasteners 51 and 52, a battery housing cap 53, a pair of the fruit stem guides 57 and 58, and a cutter penetration opening 60. The cutter housing is a slot on the header. The cutter housing can hide a portion of the cutter of the cutter assembly. A conductor guide slot 59 is on the bottom surface of the cutter housing. The conductor guide slot is formed by a pair of protruding objects 61 on the bottom surface of the cutter housing. A conductor guide 62 which a rounded edge is on the bottom side of the cutter housing. The header male fasteners are objects which protrude from the bottom surface of the cutter housing and which can engage with the header female fasteners of the basket unit. The battery housing cap is another object which protrudes from an edge of the cutter housing and which can serve as a cap for the battery compartment of the basket unit. The battery housing cap has a pair of battery housing cap closers, 54 and 55, which are objects protruding from the bottom surface of the battery housing cap. The battery housing cap closers can ensure the battery housing cap to closely cover the battery compartment of the basket unit. The battery housing cap also has a battery housing cap hinge 56 which is a groove on the bottom surface of the battery housing cap. The battery housing cap hinge can facilitate the battery housing cap to be opened/closed on to the battery compartment. The pair of the fruit stem guides is objects protruding from the cutter housing. The gap between the fruit stem guides can guide the stem of a fruit to be picked toward the knife of the cutter assembly. The gap also leads to an opening, the cutter penetration opening 60, on the cutter housing.

Figure 7:
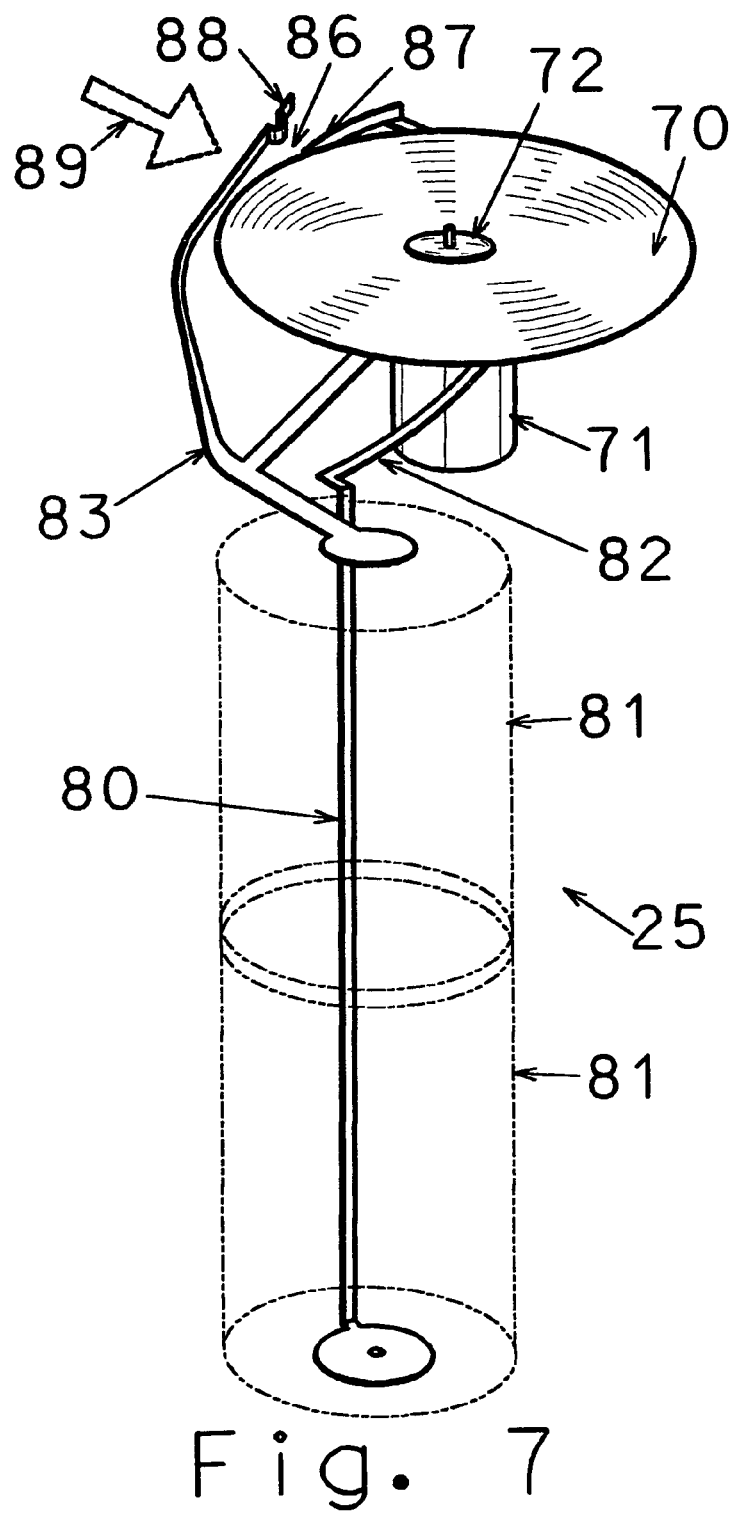
FIG. 7 is an isometric view of a component, the cutter assembly, of the device shown in FIG. 1. No hidden line is shown in FIG. 7.
Figure 8:
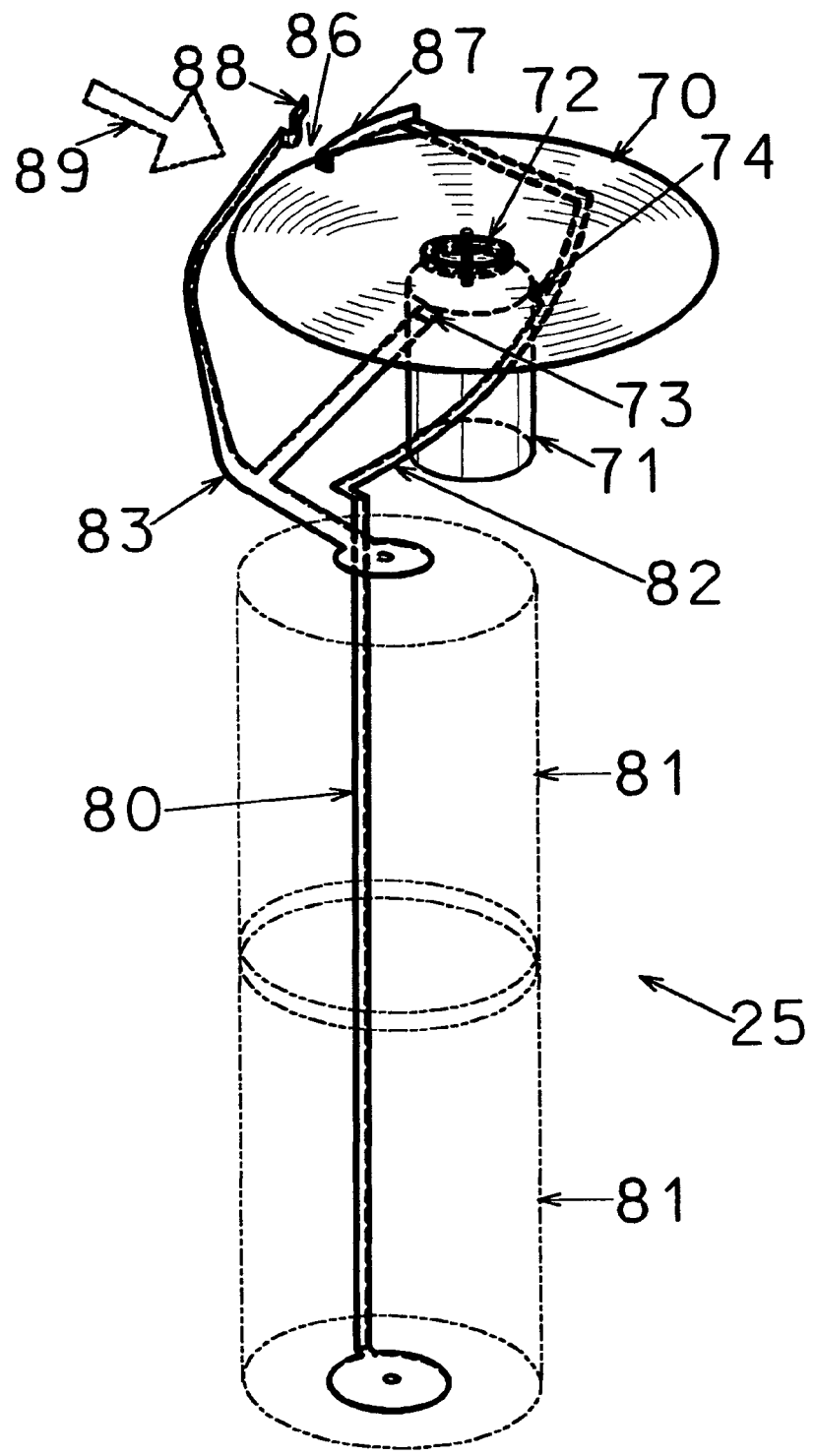
FIG. 8 is an isometric view of the same component shown in FIG. 7.

Referring to FIG. 7 and FIG. 8, the cutter assembly 25 consists of a cutter 70, a motor 71, a set of cutter fasteners 72, and a wire/conductor loop 80. The wire/conductor loop consists of two conductors 82 and 83 which one ends connects with the batteries 81. The other ends 87 and 88 of the conductors 82 and 83 are not connected normally but are capable to be connected when being pushed by a force 89 to close the gap 86 between them. The cutter is a knife (a circular one is shown) which is mounted on an electrical motor, the motor 71, by using a set of fasteners, the cutter fasteners 72. The motor has two conductor connectors 73 and 74 which can connector with the conductors 83 and 82, respectively.

Figure 9:
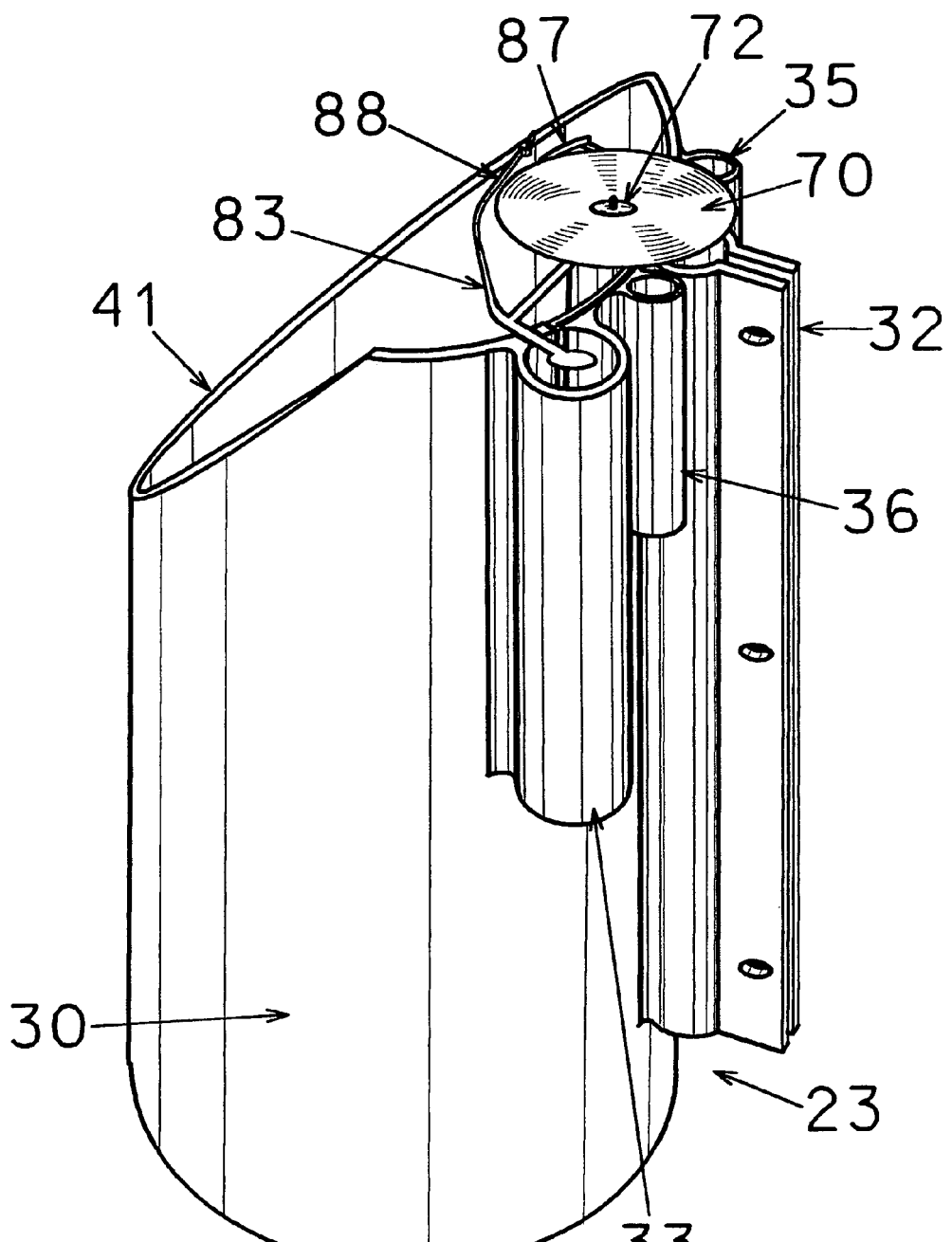
FIG. 9 is an isometric view of the mounted together components, the cutter assembly and the basket unit. No hidden line is shown in FIG. 9.
Figure 10:
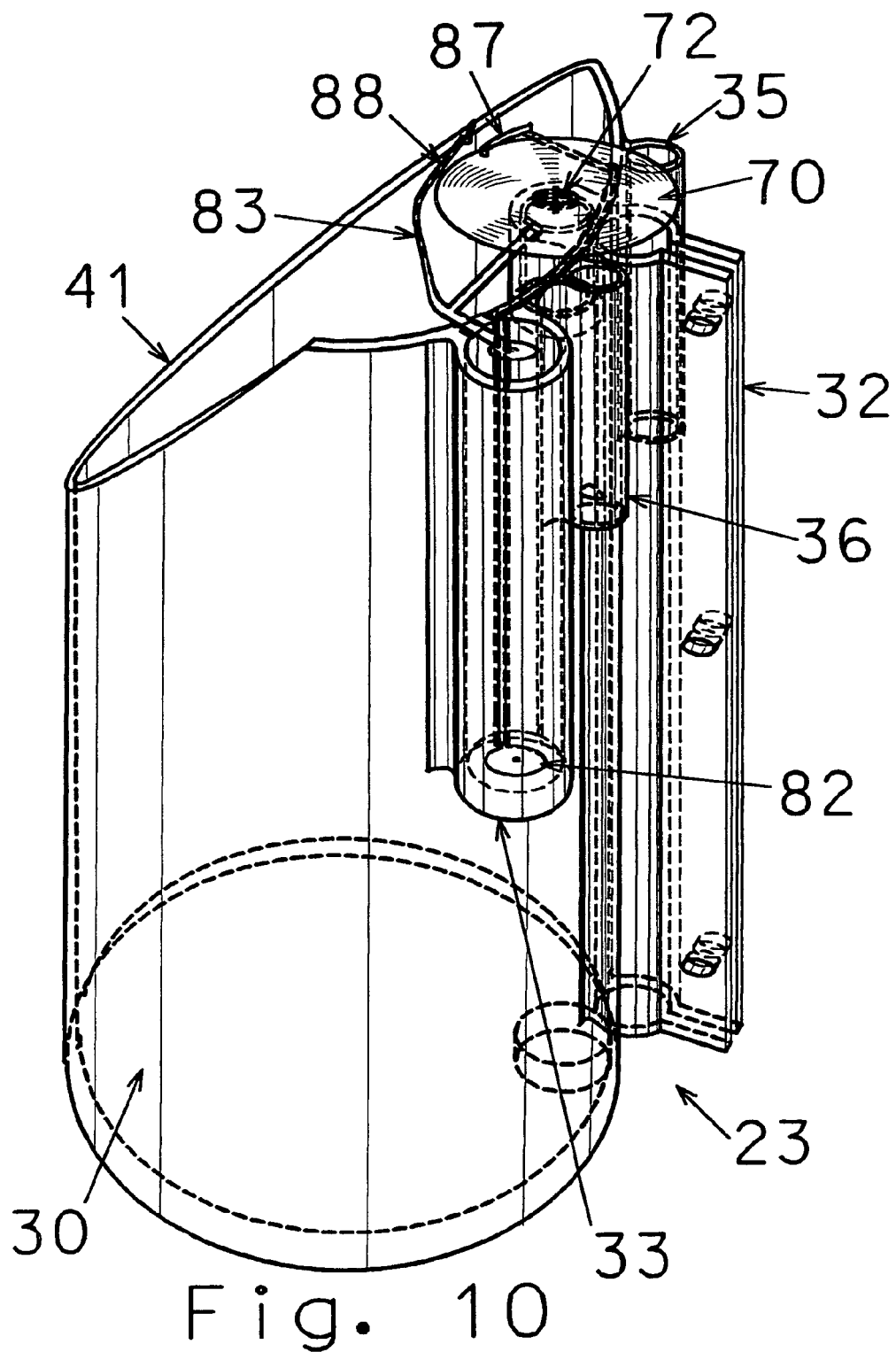
FIG. 10 is an isometric view of the mounted together components shown in FIG. 9.

Referring to FIG. 9, FIG. 10 and FIG. 1 though FIG. 8, to assemble the invented devices, a portion of the wire/conductor loop 82 and 83 is put into the battery compartment 33 of the basket 30 in the conductor grooves. The motor is put into the motor housing. The header then is put on the basket with its header male fasteners engaging with the header female fasteners of the basket. Then, the cutter is mounted on the axle of the motor by the cutter fasteners with the cutter partially in the cutter housing. For simplicity purposes, the header is not shown in FIG. 9 and FIG. 10.

Figure 11:
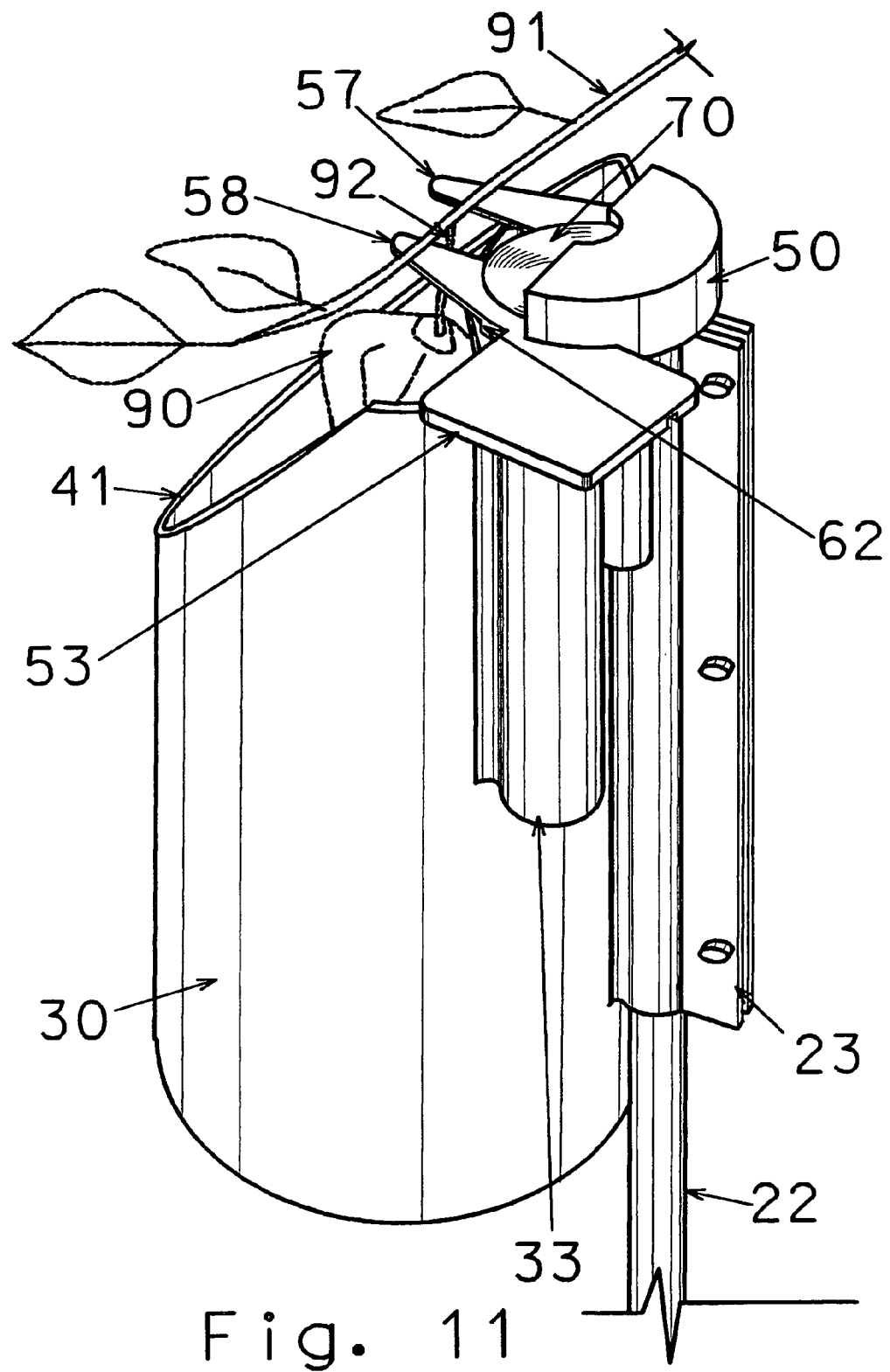
FIG. 11 is an isometric view which illustrates the use of the invented device. No hidden line is shown in FIG. 11.

Referring to FIG. 11, before using an invented device, the device will be mounted onto a pole 22 and the battery or batteries be inserted in the battery compartment 33. In using the device, the user (not shown) will raise the device to a fruit 90 to be picket. The user will firstly let the fruit to be inside the basket 30. Then the user let the stem 92 of the fruit be inside the gap between fruit stem guides 57 and 58. The fruit stem guides are between the branch 91 and the fruit 90 at this point. Then the user moves forward the invented device and lets the stem 92 push the conductor 83 of the cutter assembly. The conductor 83 will be pushed and bent to close the conductor opening 86 (referring to FIG. 8) to contact with the conductor 87 (referring to FIG. 8) then the electricity loop is closed and the motor is turned on to turn the cutter. When the device is moved further forward the cutter will cut break the stem 92 of the fruit 90 and the fruit will fall into the basket. After the fall of the fruit, there will be no stem to push the conductor 83 and the conductor will spring back to its original place. The sprung away conductor 83 will reinstate the conductor opening 86 and will open the electricity loop. The motor will then stop and the cutter will stop. The user then can move the invented device onto another fruit to be picked or to collect the fruits from the basket 30.

Figure 12:
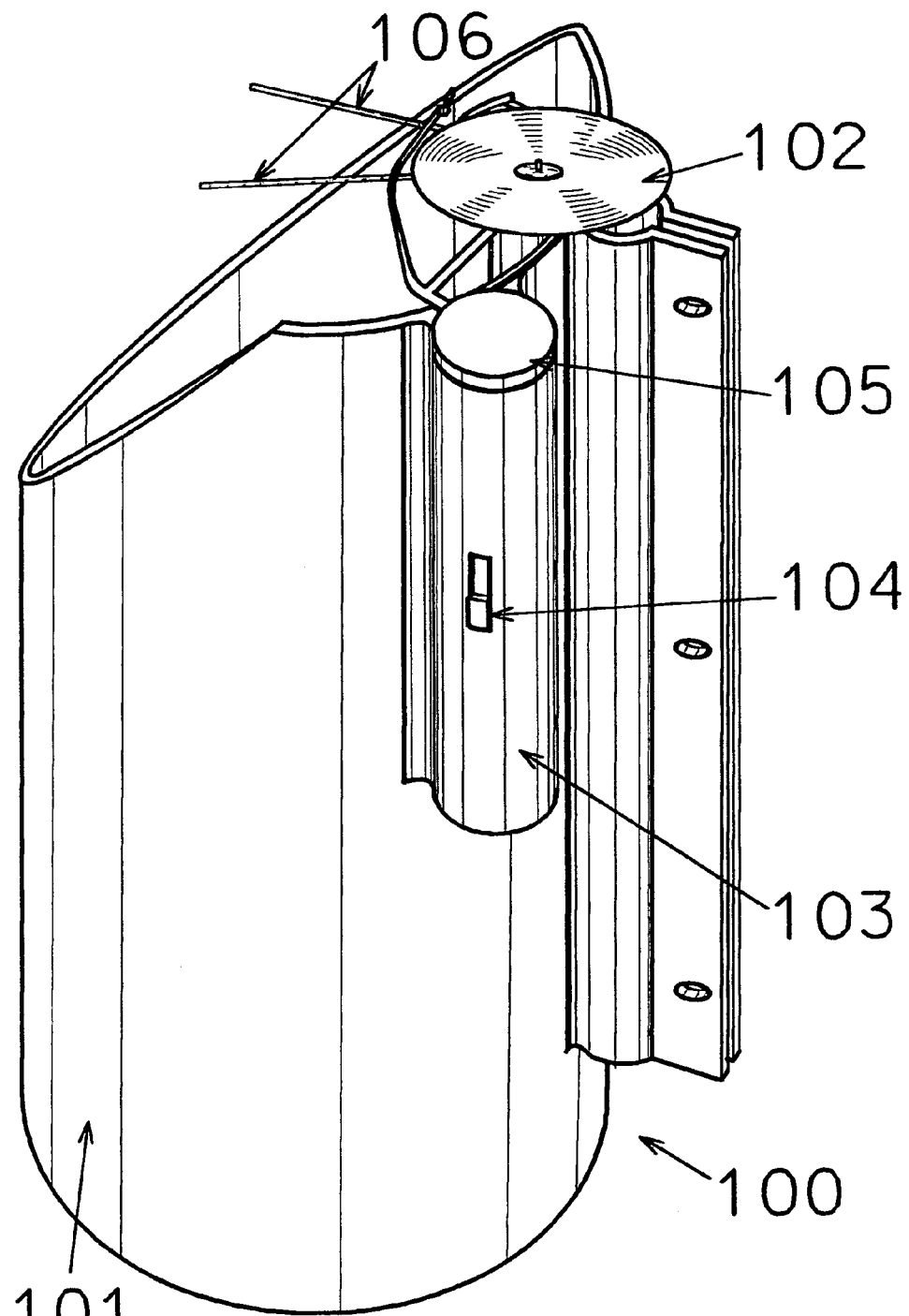
FIG. 12 is an isometric view of a variation of the invented device. No hidden line is shown in FIG. 12.
Figure 13:
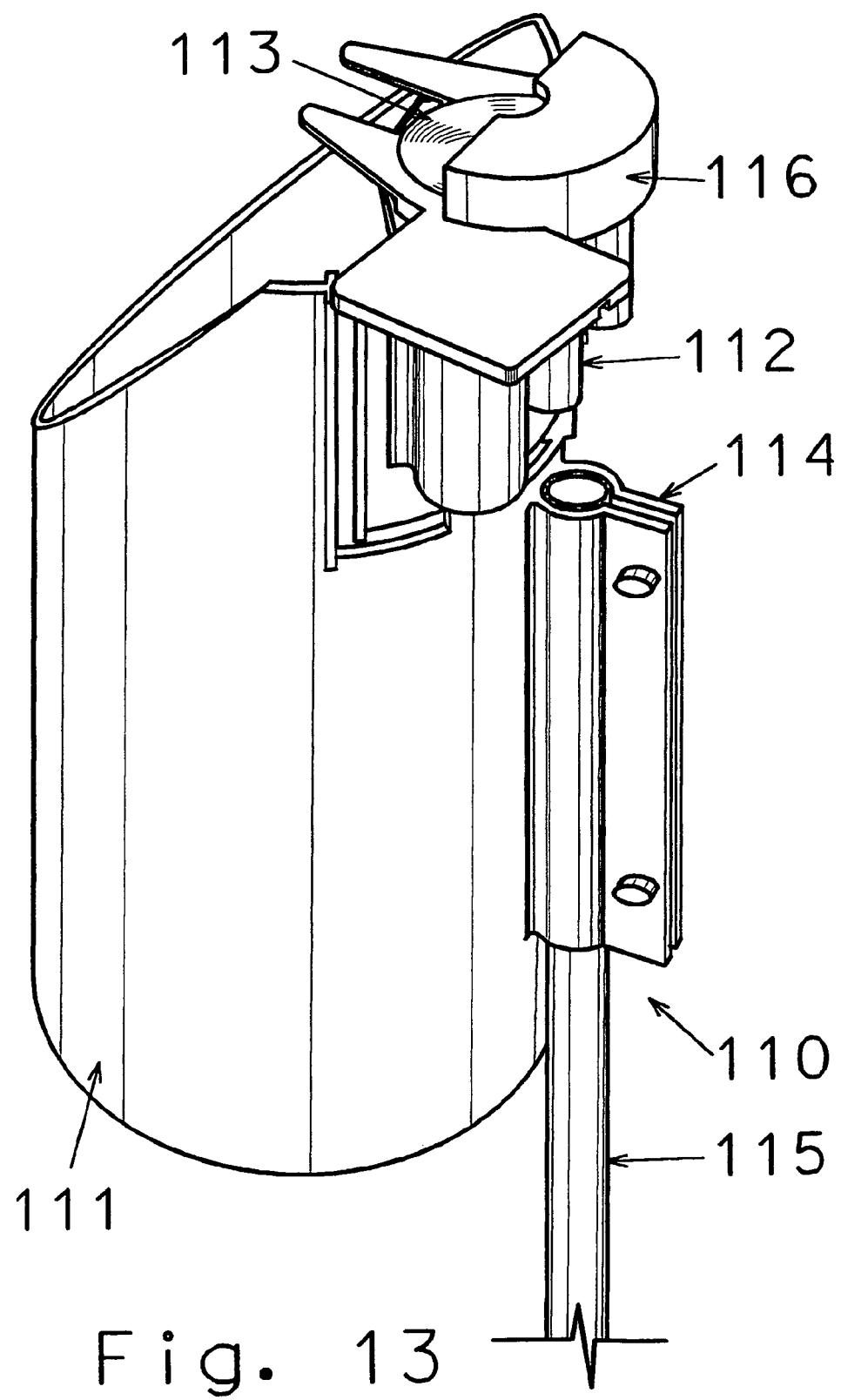
FIG. 13 is an isometric view of another variation of the invented device. No hidden line is shown in FIG. 13.
Figure 14:
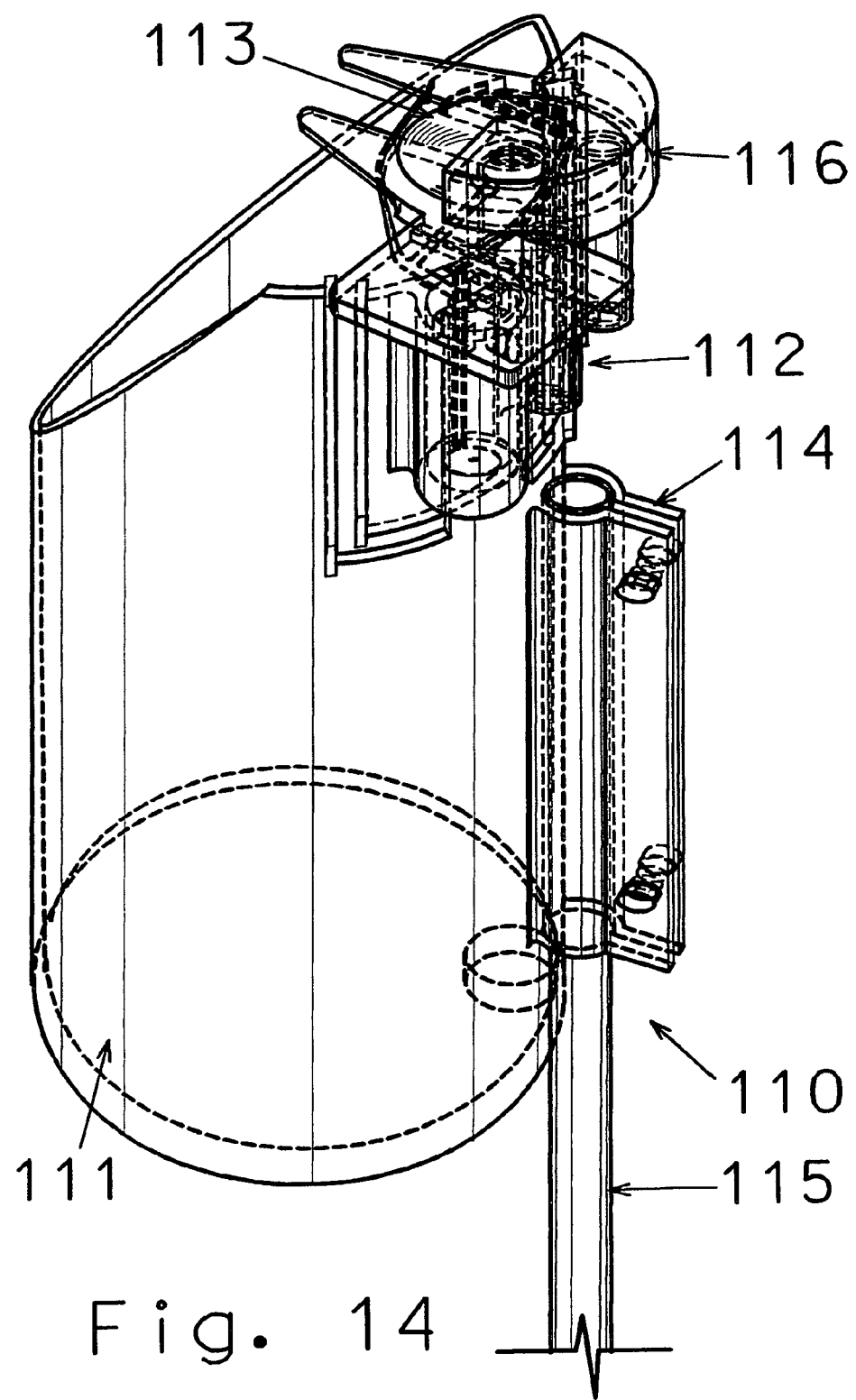
FIG. 14 is an isometric view of the invented device shown in FIG. 14. All lines are shown in FIG. 14.

Referring to FIG. 12, the second variation of the invented fruit picker apparatus with a motor operated cutter 100 consists of a basket unit 101 and a cutter assembly 102. The basket unit can be mounted on a pole. The cutter assembly is mounted on the basket unit. This variation of the invented device is similar to that described in FIGS. 1 to 10 except that the current variation does not have the header. Therefore, the basket unit of this variation is similar to the basket unit described in FIGS. 1 to 10 with the exception that the current basket does not have the header female fasteners 35 and 36 (referring to FIG. 3). The battery compartment has a cap 105 and an optional switch 104 which provides the option to open the wire/conductor loop. There is a pair of optional fruit stem guides 106 which are rods protruding from the motor housing and which serve the same functions as those described for the first variation of the invented devices.

Referring to FIG. 13 to FIG. 18, the third variation of the invented fruit picker apparatus with a motor operated cutter 110 consists of a basket unit 111, a header unit 112, and a cutter assembly 113. The cutter assembly is the same as those described for the first variation of the invented devices.

Figure 15:
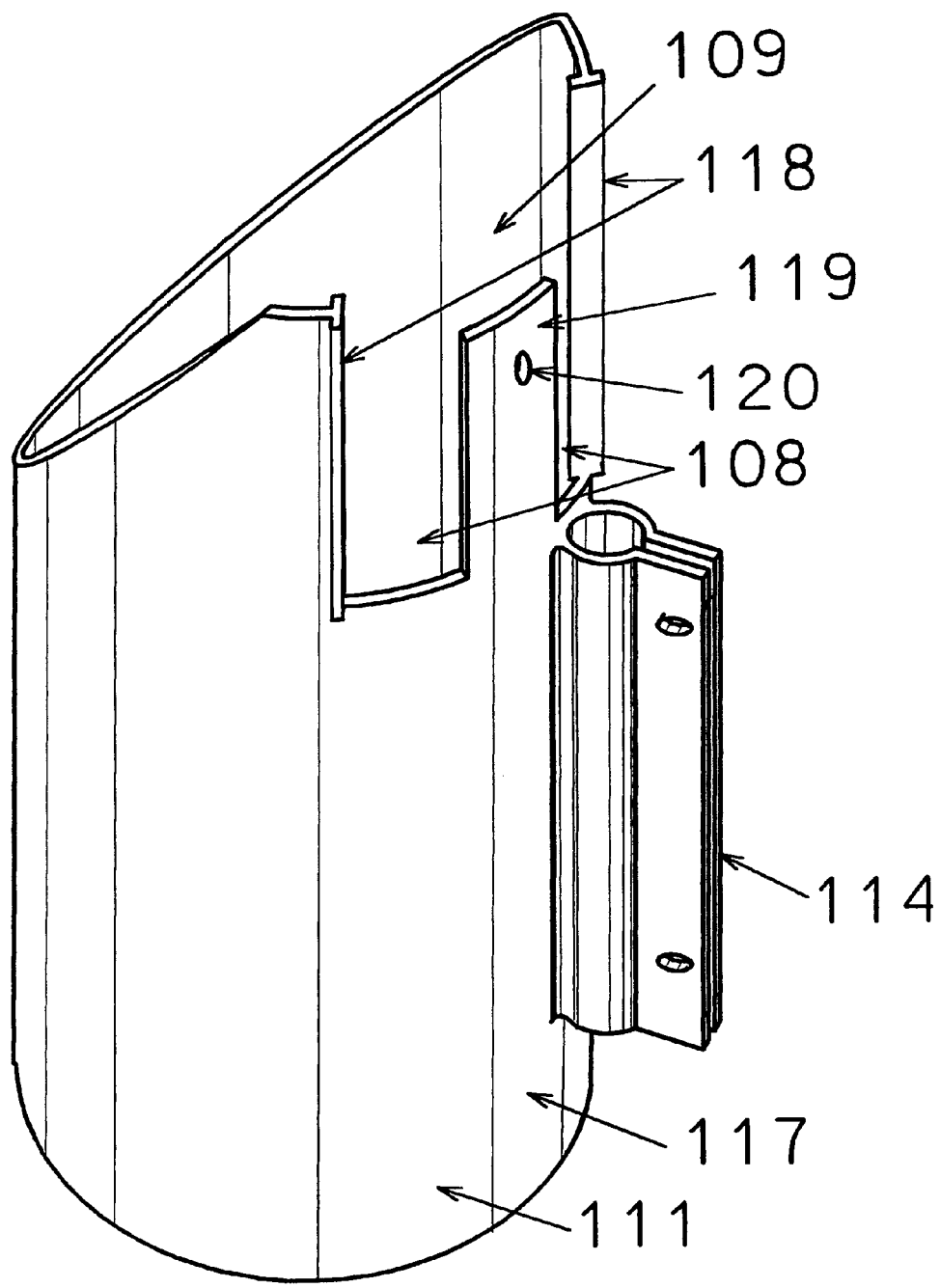
FIG. 15 is an isometric view of the component, the basket unit, of the device shown in FIG. 13. No hidden line is shown in FIG. 15.
Figure 16:
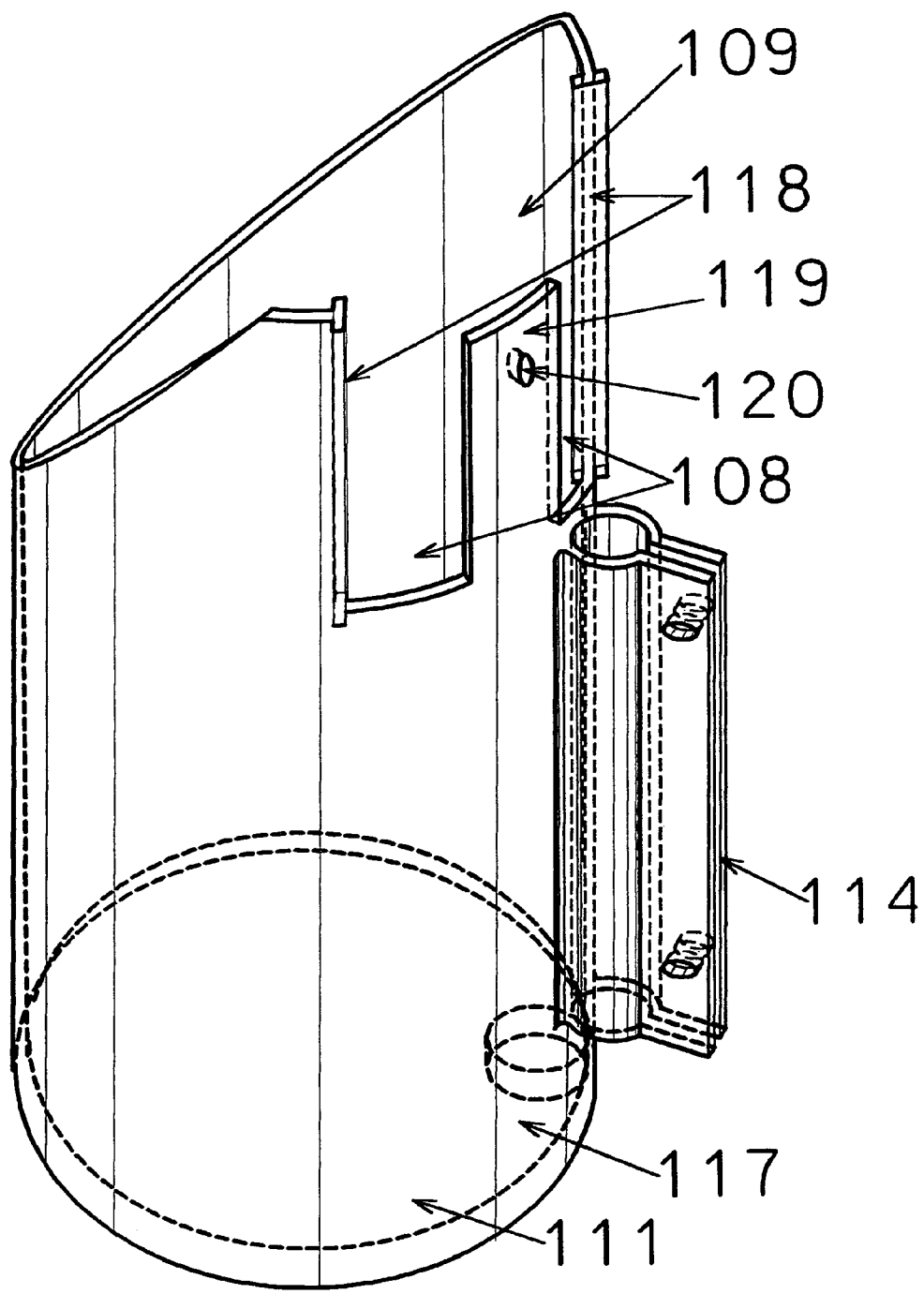
FIG. 16 is an isometric view of the same component shown in FIG. 15.

Referring to FIGS. 15 and 16, the basket unit 111 of the third variation of the invented devices consists of a clamp 114 and a basket 117. The basket is a container which can hold and protect the picked fruits inside. The clamp is a clamp which enables the basket unit to be mounted on a pole. Above the clamp, the basket has a header unit mounting plate 119 which is a plate protruding from a recessed rim 109 of the basket. There is a hole, the header unit mounting hole 120, on the header unit mounting plate. There is a gap, the basket unit stop gap 108, between one side of the header unit mounting plate and the basket. At the basket rims which facing the header unit mounting plate there are widened strips, the header unit stoppers 118.

Figure 17:
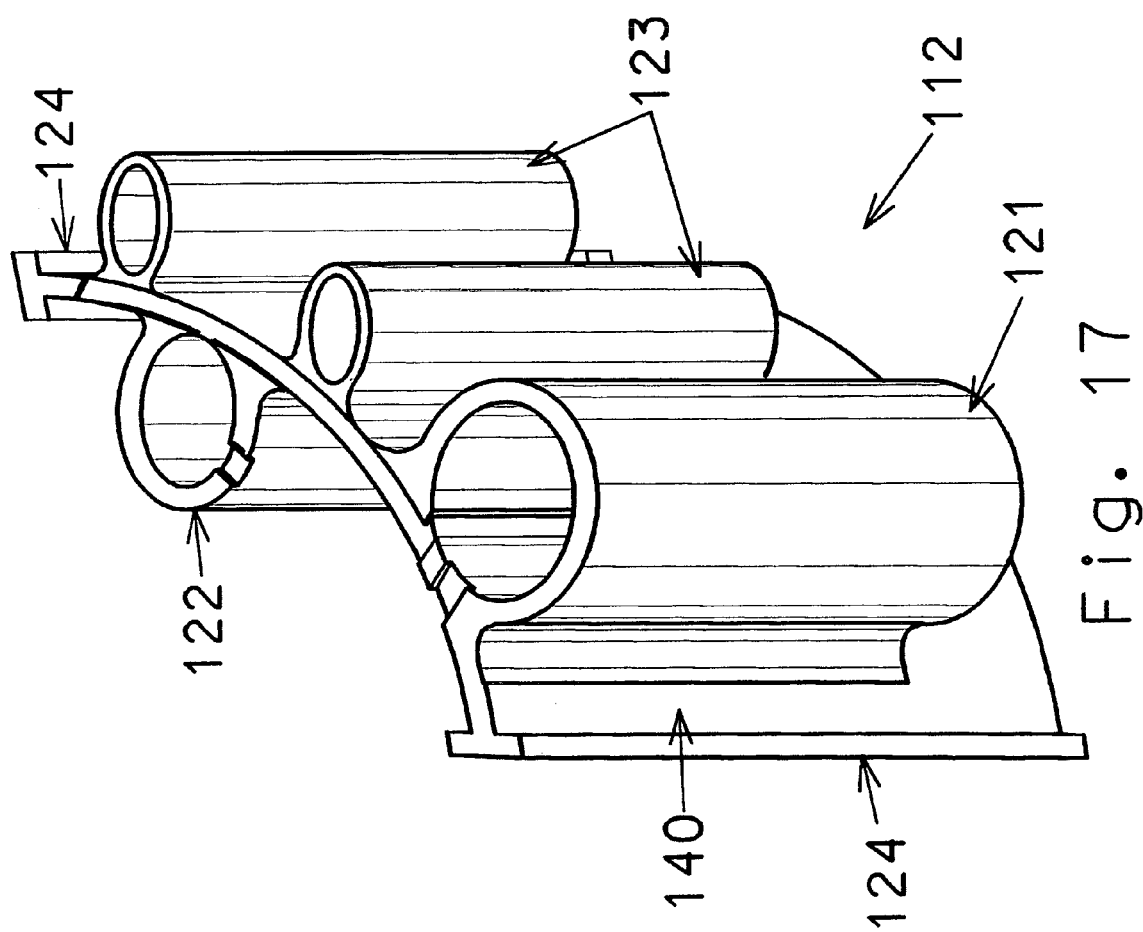
FIG. 17 is an isometric view of the component, the header unit, of the device shown in FIG. 13. No hidden line is shown in FIG. 17.
Figure 18:
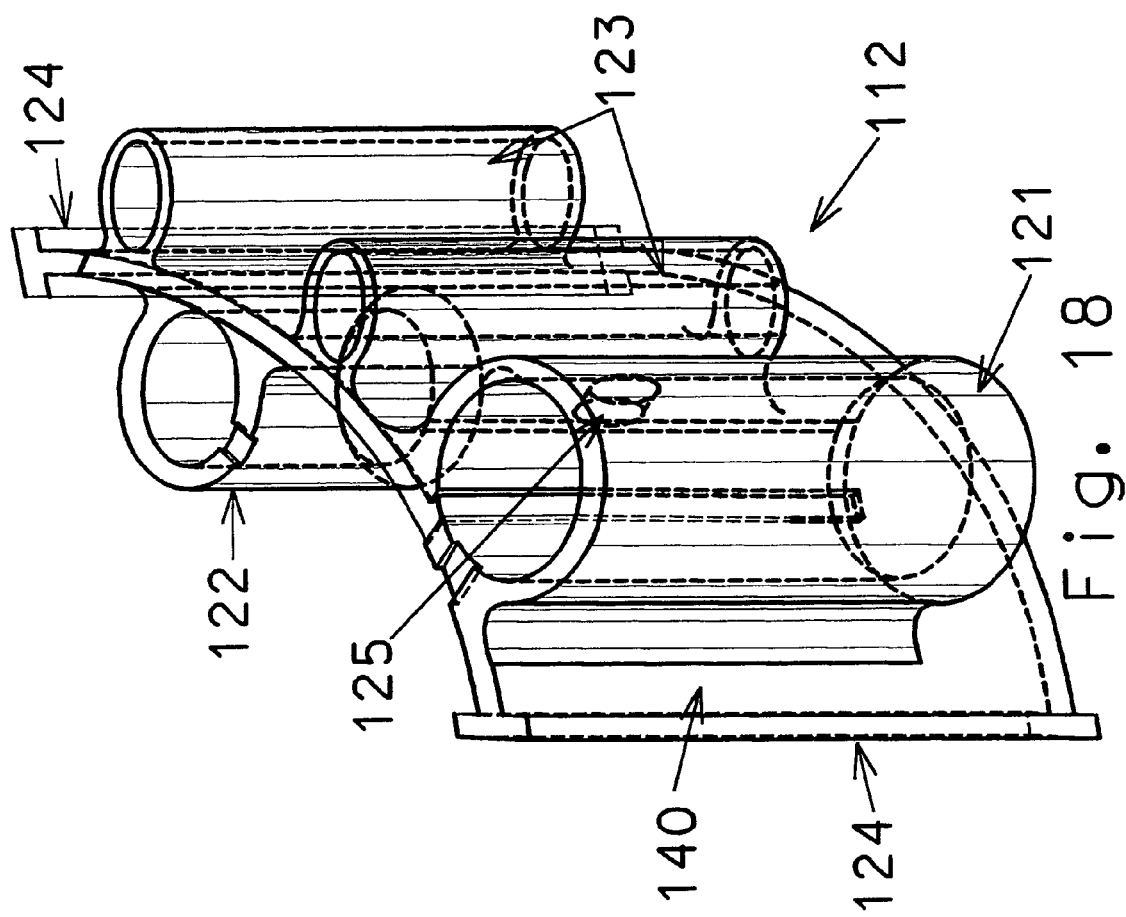
FIG. 18 is an isometric view of the same component shown in FIG. 17.

Referring to FIGS. 17 and 18, the header unit 112 consists of a header unit mounting plate 140, a battery compartment 121, a motor housing 122, and two header female fasteners 123, and a header (not shown). The header unit mounting plate is plate on which the other components of the header unit are mounted to. There is a hole, the header unit mounting hole 125, on the header unit mounting plate. On the longitudinal ends of the header unit mounting plate there are thickened portions, the basket unit stop 124. The battery compartment, the motor housing, the header, and the header female fasteners are the same as those described in the first variation of the invented devices. The header and the cutter assembly are mounted on the header unit in the similar ways as those mounted on the basket unit of the first variation of the invented devices.

The header unit is mounted on the basket unit by a mounting mean such as a rivet or a bolt-nut-washer unit. When the header unit is mounted on the basket unit, the basket unit stops 124 (referring to FIG. 17) will be in the basket unit stop gaps 108 (referring to FIG. 15). The basket unit stop gaps will give the header unit some degrees of freedom to rock sideways with respect to the basket unit. But, the header unit stoppers 118 (referring to FIG. 15) and the basket unit stops 124 will limit the degrees the header unit can tilt relative to the basket unit.

Figure 19:
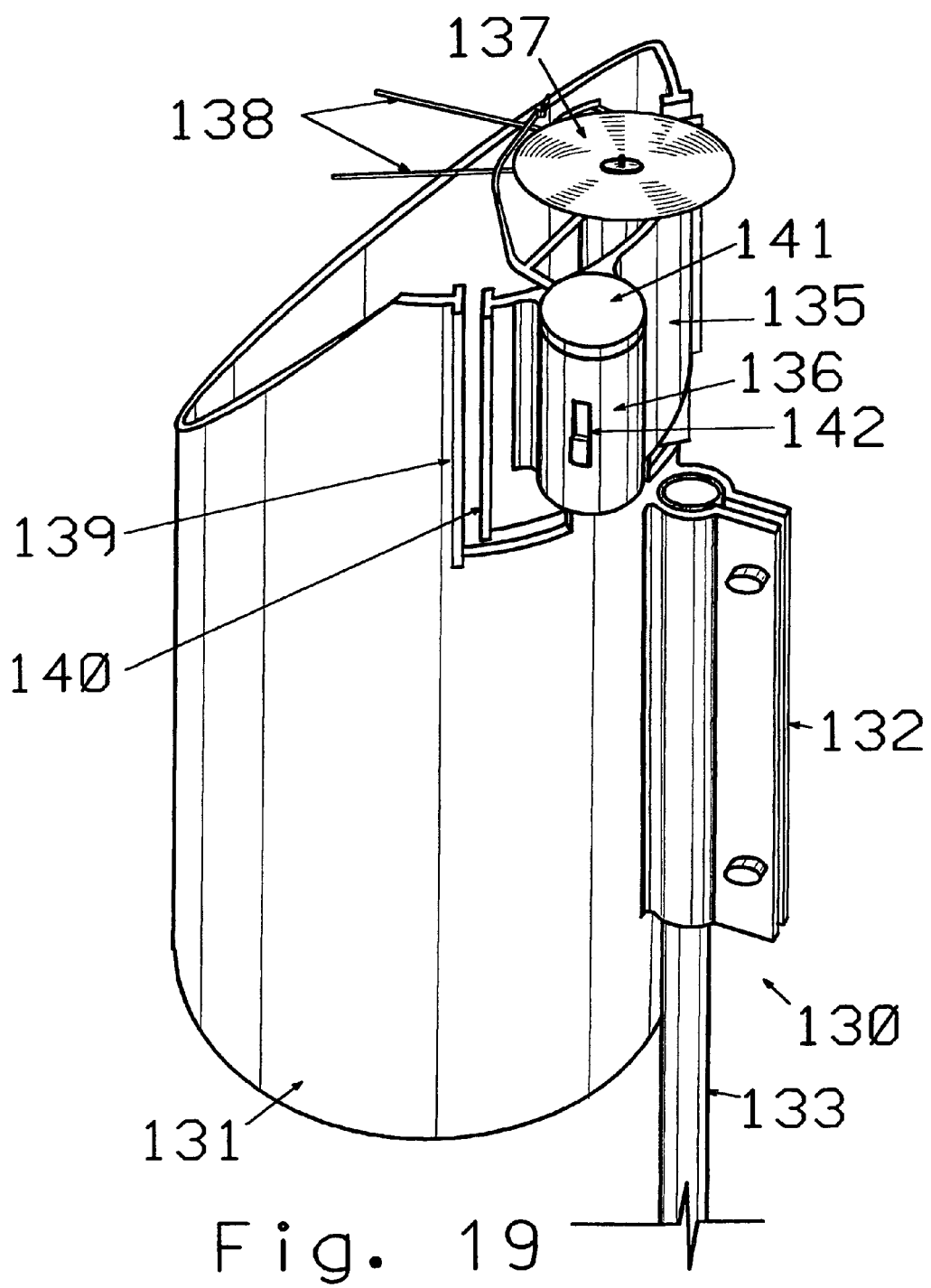
FIG. 19 is an isometric view of the fourth variation of the invented device. No hidden line is shown in FIG. 19.

Referring to FIG. 19, the fourth variation of the invented fruit picker apparatus with a motor operated cutter 130 consists of a basket unit 131, a header unit 135, and a cutter assembly 137. The basket unit can be mounted on a pole. The header unit is mounted on the basket unit. The cutter assembly is mounted on the header unit. This variation of the invented device is similar to that described in FIGS. 13 to 18 except that the current variation does not have the header. Therefore, the header unit of this variation is similar to the header unit described in FIGS. 13 to 18 with the exception that the current header unit does not have the header female fasteners 123 (referring to FIG. 17). The battery compartment has a cap 141 and an optional switch 142 which provides an option to open the wire/conductor loop. There are a pair of optional fruit stem guides 138 which are rods protruding from the motor housing and which serve the same functions as those described for the first variation of the invented devices.

The uses of the second, the third and the fourth variations of the invented devices are similar to that for the first variation's. The third and the fourth variations of the invented devices allow the cutters to be in about right angles with respect to the stems of the fruits to be picked because the cutter assembly can tilt with the header unit.

The foregoing is considered as illustrative only of the principles of the invention. Furthermore, since numerous modifications and changes will readily occur to those skilled in the art, it is not desired to limit the invention to the exact construction and operation shown and described, and accordingly all suitable modifications and equivalents, may be resorted to, falling within the scope of the invention as claimed.

As described and shown in the drawings, the switch is normally open, said switch including a part positioned in closely spaced relation to the knife and in the path of fruit stem relative travel toward the knife, whereby the stem engages said part to close the switch causing motor operation and knife motion to sever the stem traveling along said path, the basket at that time assuredly positioned to receive the fruit.

SEQUENCE LISTING

Not Applicable

We claim:

1. A fruit picker apparatus with a motor operated cutter which can be mounted on a pole consists of:
   a) a basket unit and a cutter assembly;
   b) said cutter assembly having a knife which is mounted on the motor which connects with a conductor loop electric circuit which includes a switch;
   c) said basket unit having a basket opening toward the knife for holding and protecting fruits;
   d) said basket unit having a motor housing for holding said motor of said cutter assembly;
   e) said basket unit having a clamping device which enables said basket unit to be clamped on a pole or a rod;
   f) said basket unit having a battery compartment for holding at least one battery and a portion of said conductor loop of said cutter assembly;
   g) said switch being normally open, said switch including a part positioned in closely spaced relation to the knife and in the path of fruit stem relative travel toward the knife, whereby the stem engages said part to close the switch causing motor operation and knife motion to sever the stem traveling along said path, the basket at that time assuredly positioned to receive the fruit.

2. A fruit picker apparatus of claim 1 in which said basket unit has a means for mounting said cutter assembly.

3. A fruit picker apparatus with a motor operated cutter of claim 1 in which said cutter assembly has a pair of fruit stem guides which are spaced-apart protruding objects extending toward the switch.

4. A fruit picker apparatus with a motor operated cutter of claim 1 in which said switch part has an elongated arm to close said conductor loop when being pushed against the stem of a fruit to be picked.

5. A fruit picker apparatus with a motor operated cutter of claim 1 in which said cutter assembly has an additional switch for opening said conductor loop.

6. A fruit picker apparatus with a motor operated cutter of claim 1 including a header which is a cover for said cutter assembly and which has a fastening device to connect with said basket unit.

7. A fruit picker apparatus with a motor operated cutter of claim 6 in which said header has a pair of fruit stem guides extending toward the switch and which are spaced-apart protruding objects.

8. A fruit picker apparatus with a motor operated cutter of claim 6 in which said header has a cutter housing which covers a portion of said knife of said cutter assembly.

9. A fruit picker apparatus with a motor operated cutter of claim 6 in which said header has a means for mounting said cutter assembly.

10. A fruit picker apparatus with a motor operated cutter of claim 6 in which said cutter assembly has an additional switch for opening said conductor loop.

11. A fruit picker apparatus with a motor operated cutter which can be mounted on a pole consists of:
    a) a header unit, a basket unit and a cutter assembly;
    b) said cutter assembly having a knife which is mounted on the motor which connects with a conductor loop electric circuit which includes a switch;
    c) said basket unit having a basket which can hold and protect fruits;
    d) said header unit having a motor housing for holding said motor of said cutter assembly;
    e) said basket unit having a clamping device which enables said basket unit to be clamped on a pole or a rod;
    f) said header unit having a battery compartment for holding at least one battery and a portion of said conductor loop of said cutter assembly;
    g) said header unit holding said cutter assembly;
    h) said header unit being mounted on said basket unit such that relative movements between said header unit and said basket unit can exist;
    i) said switch being normally open, said switch including a part positioned in closely spaced relation to the knife and in the path of fruit stem relative travel toward the knife, whereby the stem engages said part to close the switch causing motor operation and knife motion to sever the stem traveling along said path, the basket at that time assuredly positioned to receive the fruit.

12. A fruit picker apparatus with a motor operated cutter of claim 11 in which said header unit has a means for mounting said cutter assembly.

13. A fruit picker apparatus with a motor operated cutter of claim 11 in which said header unit has a pair of fruit stem guides which are spaced-apart protruding objects in proximity to said switch.

14. A fruit picker apparatus with a motor operated cutter of claim 11 in which said switch part has an elongated arm to close said conductor loop when being pushed against the stem of a fruit to be picked.

15. A fruit picker apparatus with a motor operated cutter of claim 11 in which said cutter assembly has an additional switch for opening said conductor loop.

16. A fruit picker apparatus with a motor operated cutter of claim 11 wherein said header provides a cover for said cutter assembly which has a fastening device to connect with said header unit.

17. A fruit picker apparatus with a motor operated cutter of claim 11 wherein said header provides a cover for said cutter assembly and which has a pair of fruit stem guides which are spaced-apart protruding objects.

18. A fruit picker apparatus with a motor operated cutter of claim 17 in which said header has a cutter housing which covers a portion of said knife of said cutter assembly.

19. A fruit picker apparatus with a motor operated cutter of claim 17 in which said header has a means for mounting said cutter assembly.

\* \* \* \* \*